United States Patent [19]

Patterson et al.

[11] Patent Number: 4,736,625

[45] Date of Patent: Apr. 12, 1988

[54] METHOD AND APPARATUS FOR MONITORING THE CUTTING CONDITION OF A MACHINE TOOL DURING MACHINING OF A WORKPIECE

[75] Inventors: Richard L. Patterson, South Euclid; Andrew J. Fedak, Elyria, both of Ohio

[73] Assignee: The Warner & Swasey Company, Cleveland, Ohio

[21] Appl. No.: 927,017

[22] Filed: Nov. 5, 1986

[51] Int. Cl.⁴ .............................................. G01N 3/58
[52] U.S. Cl. ...................................... 73/104; 340/680; 340/683; 364/475
[58] Field of Search .................. 73/104; 340/680, 683; 364/475

[56] References Cited

U.S. PATENT DOCUMENTS

| | | | |
|---|---|---|---|
| 3,895,526 | 7/1975 | Pozzetti | 73/104 |
| 4,087,801 | 5/1978 | Noh | 73/104 X |
| 4,207,567 | 6/1980 | Juengel et al. | 73/104 X |
| 4,220,995 | 9/1980 | Slode | 73/104 X |
| 4,228,514 | 10/1980 | Weiss | 73/104 X |
| 4,351,029 | 9/1982 | Maxey et al. | 73/104 X |
| 4,442,494 | 4/1984 | Fromson et al. | 73/104 X |
| 4,471,444 | 9/1984 | Yee et al. | 73/104 X |
| 4,514,797 | 4/1985 | Begin | 73/104 X |
| 4,563,897 | 1/1986 | Moore | 73/104 X |
| 4,636,779 | 1/1987 | Thames et al. | 73/104 X |

Primary Examiner—Tom Noland
Attorney, Agent, or Firm—Thomas K. Ziegler; Raymond J. Eifler

[57] ABSTRACT

A device-implemented method for monitoring the cutting condition of a machine tool during machining of a workpiece senses acoustic emissions resulting from the machining of the workpiece, produces an electrical signals which varies in accordance with changes in the sensed acoustic emissions, and variably amplifies the signal by a gain level selected by a set of digital data stored in the memory (12) of a computer (15). The signal is amplified by an amplifier (32) having a variable gain input (34) controlled by the computer (15). The signal is processed by two circuits (36, 40, 56 and 36, 42, 50) which respectively generate two separate sets of digital data representing the cutting condition of the tool. The computer (15) compares the data with memory-stored information to determine whether an alarm signal should be generated. A circuit (75) is provided for generating a control signal indicating that cutting of the workpiece has commenced.

8 Claims, 1 Drawing Sheet

METHOD AND APPARATUS FOR MONITORING THE CUTTING CONDITION OF A MACHINE TOOL DURING MACHINING OF A WORKPIECE

The present invention broadly relates to tool monitoring systems of the type which monitor the cutting condition of a machine tool during machining of a workpiece, and deals more particularly with a system which monitors at least one parameter that varies as a result of the machining process.

BACKGROUND ART

Tool monitoring systems which monitor the acoustic emissions resulting from a machine tool cutting process are well known in the art. One type of known tool monitoring system employing acoustic emissions amplifies the acoustic emissions, detects the envelope of the amplified acoustic emissions and then converts the envelope to a signal representing the RMS value of the envelope. This RMS signal is compared with a threshold value to determine whether an alarm signal should be generated, wherein the alarm signal indicates an unacceptable cutting condition, as where the machine tool is badly worn or has broken.

Another type of tool monitoring system employing acoustic emissions utilizes a special type of signal processing in order to determine the rate of energy being generated by the cutting process. The resulting energy rate signal is compared with the threshold value to determine whether or not an alarm should be activated.

RMS and energy rate signal processing each have its advantages and may be particularly well-suited for a particular application. In using either technique described above, it has been found to be important to maintain the signal resulting from the acoustic emissions to within a prescribed range of values. If the signal is too high in magnitude, the processing circuitry may become saturated and thereby provide erroneous results. On the other hand, if the signal is too weak, the processing circuitry may not have sufficient sensitivity to properly process it, thereby diminishing the accuracy of the system. Although it may be possible to initially adjust the system gain for a given set of cutting conditions, the acoustic emission signal may have a wide dynamic range owing to dramatically changing cutting patterns, workpiece materials and different types of cutting tools. Consequently, an initial calibration of system gain for a given set of cutting conditions may not solve the problem. The problem mentioned above is likewise encountered in other types of tool monitoring systems which monitor other parameters which indicate the cutting condition of the tool, such as tool vibration, axial and radial tool force, etc.

Another problem associated with prior art monitoring systems such as those which monitor acoustic emissions is the difficulty in determining the point in time when actual cutting of the workpiece commences. It is important to determine when cutting commences so that the monitoring system can be properly initialized and activated.

SUMMARY OF THE INVENTION

In accordance with one aspect of the invention, an apparatus is provided for monitoring the cutting condition of a cutting machine tool during machining of a workpiece which includes a sensor for sensing at least one parameter related to the cutting condition of the machine tool and resulting from the machining of the workpiece, means for producing an electrical signal which varies in magnitude with changes in the sensed parameter, means for amplifying the electrical signal having an input for receiving a control signal that controls the gain of the amplifying means such that the magnitude of the amplified signal can be changed, and means for controlling the amplifying means such that the magnitude of the amplified electrical signal is controlled in accordance with a set of stored data. The controlling means includes means for receiving the amplified signal, means for storing a set of data defining a reference value and means for comparing the amplified electrical signal with the reference value and for generating the control signal. The controlling means includes a microcomputer having a memory for storing the data defining the reference value and a data bus for delivering control signals to a variable gain amplifier which defines the amplifying means. The output of the variable gain amplifier is processed by an envelope detector and a resulting analog signal is delivered to two individual circuits which respectively generate first and second sets of digital data respectively corresponding to the RMS value and the energy rate of the detected signal. These sets of digital data are returned to the computer for processing, and one or both sets of such data is selected for comparison to reference values represented by the stored data to determine whether an alarm signal should be generated by the computer.

According to another aspect of the invention, apparatus is provided for monitoring the cutting condition of a cutting machine tool which includes means for sensing acoustic emissions resulting from the machining of a workpiece by the tool, means for producing a first electrical signal which varies with changes in the sensed acoustic emissions, means responsive to the first electrical signal for producing a second electrical signal representing the energy rate of the sensed acoustic emissions, means responsive to the first electrical signal for producing a third electrical signal representing the RMS value of the first electrical signal, means for selecting one of the third and fourth electrical signals and for comparing the selected signal with a threshold value related to the cutting condition of the cutting tool, and means responsive to the selected means for providing an indication of when the selected signal is in a preselected relationship to the threshold value. The means for producing the second electrical signal representing the energy rate of the sensed acoustic emissions includes means for generating a count corresponding to the energy rate and means for storing the count as a set of digital data. The apparatus further includes means for converting the third electrical signal and to a second set of digital data. The selecting means includes a programmed computer comprising a central processing unit, a memory for storing the third set of data representing the threshold value and a data bus.

According to still another aspect of the invention, a method is provided for monitoring the cutting condition of a cutting machine tool during machining of a workpiece which comprises the steps of sensing a parameter related to the cutting condition of the machine tool and resulting from the machining of a workpiece by the tool, producing an electrical signal which varies in magnitude with changes in the sensed parameter, amplifying the electrical signal, storing data representing reference values and varying the amplification of the electrical signal in accordance with the stored data so that the magnitude of the electrical signal is established at a desired reference value. The method further contemplates the steps of converting the amplified electrical signal to an RMS signal representing the RMS value of the amplified signal, converting the amplified electrical signal to a first set of digital data representing the energy rate of the acoustic emissions, and converting the RMS signal into a second set of digital data. One or both of the first and second sets of data is selected and compared with a threshold value in order to generate an alarm signal when the cutting condition of the machine tool is unacceptable.

A primary advantage of the present invention is to provide apparatus for monitoring the cutting condition of a cutting machine tool during machining of a workpiece which eliminates manual operator controls and increases monitoring accuracy by automatically monitoring multiple parameters related to the cutting condition of the machine tool.

Another advantage of the present invention is to provide an apparatus for monitoring the cutting condition of a cutting machine tool during machining of the workpiece in which the magnitude of an electrical signal related to the cutting condition of the machine tool and resulting from the machining process is initially set or normalized at a preselected optimum value for a given set of cutting conditions which are determined, for example, by the particular cutting tool being used, the workpiece material, type of cut, etc.

Another advantage of the present invention is to provide apparatus as described above which includes a computer having a memory in which data is stored for controlling the level of the electrical signal representing the sensed parameter.

A still further advantage of the invention is to provide apparatus as mentioned above which senses acoustic emissions resulting from the machining process and wherein the acoustic emission signal is processed independently by two different circuits which generate independent output signals representing the cutting condition of the tool.

Another advantage of the present invention lies in the provision of tool monitoring apparatus employing acoustic emissions resulting from the machining process which includes a circuit for detecting when cutting has commenced.

A further advantage of the present invention resides in a method for monitoring the cutting condition of a machine tool during condition of the machine tool is fed back to a computer control system which initially sets the gain level of the signal at a preselected value determined by a set of programmed data.

These, and further advantages and objects of the invention, will be made clear or will become apparent during the course of the following description of a preferred embodiment of the present invention.

DETAILED DESCRIPTION OF THE INVENTION

Figure 1:
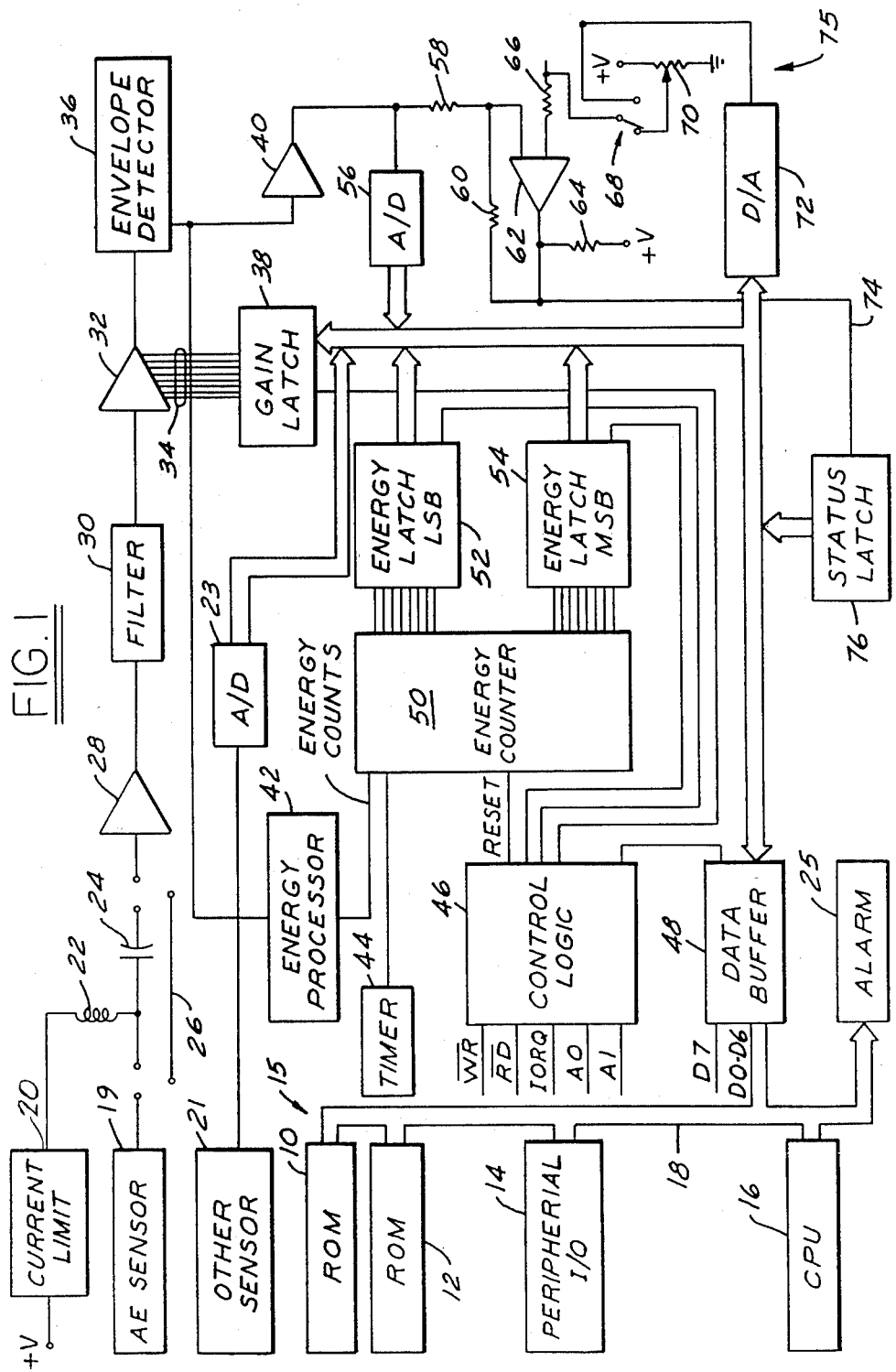

In the single drawing, FIG. 1, is a combined block and detailed schematic diagram of apparatus for monitoring the cutting condition of a cutting machine tool during machining of a workpiece which forms the preferred embodiment of the present invention and may be employed to practice the method of the present invention.

Referring to FIG. 1, the present invention generally relates to a method and apparatus for monitoring the cutting condition of a cutting machine tool during machining of a workpiece. The cutting condition of the tool is monitored by sensing a parameter such as acoustic emissions resulting from the machining process using a conventional acoustic emission sensor 19. The output of the sensor 19 is converted by later-discussed circuitry into an electrical signal which varies in accordance with changes in the acoustic emissions. The later-discussed processing circuits are controlled by a computer 15 which includes ROM (read-only memory) 10, RAM (random access memory) 12, peripheral input/output devices 14 and a CPU 16. The aforementioned components of the computer 15 are interconnected by a data bus 18 which is also connected with an alarm 25 employed to alert the machine operator that the cutting condition of the machine tool has reached an unacceptable level.

One aspect of the present invention relates to an automatic gain control, which will be described in detail below. Such gain control may be advantageously used to control the resulting signal derived from the acoustic emission sensor 19, or signals generated by other types of sensors, one such sensor being designated by the numeral 21 in FIG. 1. By way of example, the other sensor 21 may comprise a sensor which senses axial or radial force on the machine tool, machine tool vibration or the power required to displace the machine tool. It is to be understood that these sensors are merely illustrative of various types of sensors which can be used in connection with the automatic gain control system of the present invention. The output from the sensor 21 is an analog signal which is converted to digital data by an A/D converter 23. The digital data output by the converter 23 is delivered to the data bus 18 and is then processed by the computer 15.

The output of the acoustic emission sensor 19 is AC-coupled via a capacitor 24 to the input of a buffer amplifier 28. The sensor 19 is coupled in parallel with a circuit branch comprising a positive source of voltage, a current limiting circuit 20 and inductor 22 which functions as a choke. This circuit branch functions to supply power to the acoustic emission sensor 19. Alternatively, a jumper 26 is provided which replaces the circuit branch and capacitor 24 in order to directly the coule the output of the sensor 19 to the input of the buffer amplifier 28. The amplifier 28 functions to buffer the incoming signal. The buffered acoustic emission signal is filtered by a conventional filter 30 in order to attenuate low frequency components. The filter can also be a band pass filter, if desired. The filtered acoustic emission signal is delivered to a variable gain amplifier 32. The amplifier 32 includes a gain control input defined by eight input lines 34, each of which lines receives a bit of data from a gain latch 38. The output of the amplifier 32 is delivered through a conventional envelope detectors 36. The output of the envelope detector 36 is delivered through an integrator 40 which outputs a DC signal which is the RMS value of the acoustic signal. The output of the integrator 40 is converted to digital data by the A-to-D converter 56 and is output to the data bus 18.

The output of the envelope detector 36 is also delivered to an energy processor 42 which is a conventional circuit available from the Physical Acoustics Corporation of Princeton, N.J. The output of the energy processor 42 is employed to drive an energy counter 50. Energy counter 50 is reset by conventional control logic 46 which is controlled by the CPU 16. The eight least significant and eight most significant bits of data stored in the counter 50 are output on corresponding parallel lines to latches 52 and 54. The outputs of the latches 52 and 54 are respectively connected with the data bus 18. The outputs of the latches 38, 52 and 54 are controlled by the control logic 46. Control logic 46 receives a timing signal from a conventional timer 44. The clock signals output by the timer 44, which may be for example 100 milliseconds in duration, determine the timing of the reset signal delivered to counter 50 as well as the enabling control signals delivered to latches 38, 52 and 54.

A two-way data buffer 48, which is under control of the control logic 46, interconnects the computer 15 with various input and output data points via the bus 18.

A circuit generally indicated by the numeral 75 is provided for generating a signal which is indicative that machining of the workpiece has commenced. The input of the circuit 75 is formed by the output of the integrator 40. The circuit 75 includes resistors 58, 60, 64 and 66, an operational amplifier 62 employed as a comparator, a jumper selector 68 which connects the inverting input of the comparator 62 through resistor 66 with a potentiometer 70, or a D-to-A converter 72 which is connected to the data bus 18. The output of the operational amplifier 62 is delivered to a status latch 76 which stores such output. The output data stored in the status latch 76 is output to the data bus 18 when the status latch is queried by the computer 15.

OPERATION

Acoustic emissions resulting from the machining process are sensed by the sensor 19 which converts these emissions into electrical signals that are proportional in magnitude to the emissions. After being buffered by the amplifier 28, the low frequency components are removed by the filter 30 and the resulting signal is amplified by a preselected amount by the amplifier 32. As will be discussed below, the gain of the acoustic emission electrical signal is automatically initially set when cutting commences, in a manner which takes into account the unique cutting conditions that are encountered. In this manner, the signal processing circuitry does not become saturated by a signal which is too high, nor does it fail to properly process the signal due to its being too low. The initial specific gain level for the amplified signal is determined by a set of calculated data stored in RAM 12. Under control of the CPU 16, this stored set of data in the RAM 12 is delivered via the bus 18 and is temporarily stored in the gain latch 38. Eight bits of data defining the reference values and representing the calculated data are output from latch 38 on lines 34 to the control input of amplifier 32, thereby initially setting the gain of the acoustic emission electrical signal.

The envelope of the amplified, acoustic emission signals is detected by the envelope detector 36, and the resulting time-varying DS signal is delivered both to the energy processor 42 and the integrator 40. The integrator 40 integrates the DC signal into an RMS signal which is representation of the cutting condition of the tool. This RMS signal is converted to digital data 56 and is then delivered via bus 18 to the computer 15 for processing.

The output of the energy processor 42 comprises a series of pulses whose rate is proportional to the energy rate of the acoustic signal. These pulses are accumulated by the counter 50 during each 100 millisecond time interval determined by the timer 44. After a 100 millisecond time interval, the stored count is output to ltaches 52 and 54, following which the counter 50 is reset by the time 44. The data word defined by the data stored in latches 52 and 54 also defines the cutting condition of the machine tool, similar to the RMS signal output by the integrator 40. The stored data in latches 52 and 54 is delivered to the computer 15 via data bus 18 where the sampled energy rate is compared to stored reference values to determine whether an alarm 25 should be activated.

From the foregoing, it is apparent that two sets of digital data are generated, respectively representing the RMS value of and the energy rate of the acoustic emission signal. These two sets of data are delivered via the data bus 18 to the computer 15 for processing. The computer 15 may be programmed to select either or both of these sets of data for further processing. Normally, two sets of calculated values are stored in the RAM 12 which respectively correspond to threshold values for the RMS and energy rate signals. Through appropriate programming, the user may select either set of data to be compared against the stored values, or both sets of data may be compared against the stored values if desired. When the values represented by the first and second sets of data (RMS and energy rate) exceed the corresponding, calculated threshold values stored in RAM 12, the CPU 16 causes a signal to be delivered via data bus 18 to an alarm 25, thereby activating the alarm and alerting operating personnel to the fact that the cutting condition of the machine tool is unacceptable. Alternatively, the alarm signal initiated by the CPU 16 can be employed to disable the machine tool apparatus before the workpiece is damaged or the machine tool breaks.

As alluded to above, the computer 15 may be programmed to select data corresponding to the RMS output signal under one set of cutting conditions determined by the type of tool being used, the feed rate, the material being cut, etc., while the energy count data may be selected under other cutting conditions. Alternatively, the operator may program the computer 15 to monitor both the RMS value and the energy rate. Further, the operator may program the computer 15 such that the alarm 25 is activated when either of the RMS value or the energy rate exceed the threshold values, or only when both exceed the corresponding threshold values.

Acoustic emissions produced by a fresh machine tool are quite high and rapidly fall off upon initial use of the tool. Consequently, the computer 15, is programmed such that the automatic gain adjustment is delayed for a preselected length of time in order to avoid an initial gain setting which is incorrect. The data stored in the RAM 12 includes two target values between which the amplified acoustic emission signal is to be maintained. By maintaining the signal between these two calculated, target values, the signal is maintained at a relatively low level and is therefore more accurate since saturation of the signal is avoided and higher dynamic range is achieved. The computer 15 initially delivers data to the latch 38 which represents the gain level at which a cutting signal is output from the amplifier 32 is at zero level before cutting is commenced. After it is confirmed that cutting has commenced, the computer 15 delays resetting the gain for a preselected time period, as described above in order to allow the new tool to become initially dulled. The computer 15 then checks the data in the latches 52 and 54 or the data output from the converter 56 to determine whether the signal is within the range of the two target values stored in RAM 12. If the data is within range, the gain is left unchanged. However, if the data is outside of the target values, the computer 15, via software, increments the gain until the RMS or energy rate values are within the target values. When the sensed RMS or energy rate values are within the target range, the value of the gain is stored in the memory 12 and can thereafter be used under the same cutting conditions with another workpiece. In other words, the automatic gain setting operation results in the generation of memory stored data which associates a particular cutting operation with a specific gain.

In order to properly initialize the machine tool monitoring system and coordinate its operation with that of the machine tool, it is often desirable to know exactly when cutting of the workpiece commences as discussed above. The circuit 75 provides an output signal on line 74 in the nature of a single bit of information which signals the point in time when cutting commences. The RMS output signal is delivered to the non-inverting input of comparator 62 and is compared with a reference value. When jumper 68 is in the position shown in FIG. 1, the reference value is determined by the setting of the potentiometer 70. However, if jumper 68 is in the other position, the reference value on the inverting input of the comparator 62 is determined by an analog signal output by the D-to-A converter 72. This analog signal is generated by the computer 15 which stores the digital representation of the reference value in RAM 12 and outputs this digital information on bus 18 to the D-to-A converter 72. When the value of the RMS signal on the non-inverting input of comparator 62 exceeds the reference value on its inverting input, the output of the comparator 62 on line 74 goes high, and this high signal is delivered as a bit of information at an address in the status latch 76 which can then be queried by the CPU 16.

We claim:
1. Apparatus for monitoring the cutting condition of a cutting machine tool during machining of a workpiece, comprising:
  first means (19) for sensing acoustic emissions resulting from the machining of said workpiece by said cutting tool;
  second means (20-36) coupled with said first means (19) for producing a first electrical signal which varies with changes in the sensed acoustic emissions;
  third means (42, 50, 52, 54) responsive to said first electrical signal for producing a second electrical signal representing the energy rate of the sensed acoustic emissions;
  fourth means (40) responsive to said first electrical signal for producing a third electrical signal representing the RMS value of said first electrical signal;
  fifth means (15) for selecting one of said third and fourth electrical signals and for comparing the selected signal with a threshold value related to the cutting condition of said cutting tool; and,
  sixth means (25) responsive to said fifth means (15) for providing an indication when the selected signal is in preselected relationship to said threshold value.
2. The apparatus of claim 1 wherein said third means includes means (43, 50) for generating a count corresponding to said energy rate and means (52, 54) for storing said count as a first set of digital data.
3. The apparatus of claim 2, including means (56) for converting said third electrical signal into a second set of digital data.
4. The apparatus of claim 3, wherein said fifth means includes a central processing unit (16), a memory (12) for storing a third set of data representing said threshold value and a bus (18) for communicatively interconnecting said central processing unit (16) said memory (12), said storing means (52, 54) and said converting means (56).
5. The apparatus of claim 1, wherein said second means includes means (32, 38) for amplifying said first electrical signal and said fifth means (15) includes means (12) for storing data representing a preselected amplification value, said fifth means (15) being further operative for controlling said amplifying means (32, 38) in accordance with said stored data.
6. A method of monitoring the cutting condition of a cutting machine tool during machining of a workpiece, comprising the steps of:
  (A) sensing acoustic emissions related to the cutting condition of said tool and resulting from the machining of said workpiece by said tool;
  (B) producing an electrical signal which varies in magnitude with changes in the acoustic emissions sensed in step (A);
  (C) amplifying said electrical signal;
  (D) storing data representing reference values; and
  (E) varying the amplification of said electrical signal performed in step (C) in accordance with said stored data to establish the magnitude of said electrical signal at a desired reference value;
  (F) converting said amplified electrical signal to an RMS signal representing the RMS value of said amplified electrical signal;
  (G) converting said amplified electrical signal to a first set of digital data representing the energy rate of said acoustic emissions;
  (H) converting said RMS value into a second set of digital data;
  (I) selecting one of said first and second sets of digital data to be compared with the reference data stored in step (D) in accordance with the memory stored programmed instructions;
  (J) comparing the set of digital data selected in step (I) with the data stored in step (D); and,
  (K) selectively activating an alarm based on the results of the comparison performed in step (J).
7. The method of claim 6, including the step of delaying the performance of step (E) for a predetermined length of time to allow said machine tool to be initially dulled.
8. The method of claim 6, including the steps of:
  selecting data stored in step (D) which correspond to two of said reference values; and
  determining whether the magnitude of said amplified electrical signal is between said two reference values,
  step (E) being performed in a manner such that the amplification of said reference value is varied until the magnitude of said amplified electrical signal is between said two reference values.

* * * * *